United States Patent Office 3,153,076
Patented Oct. 13, 1964

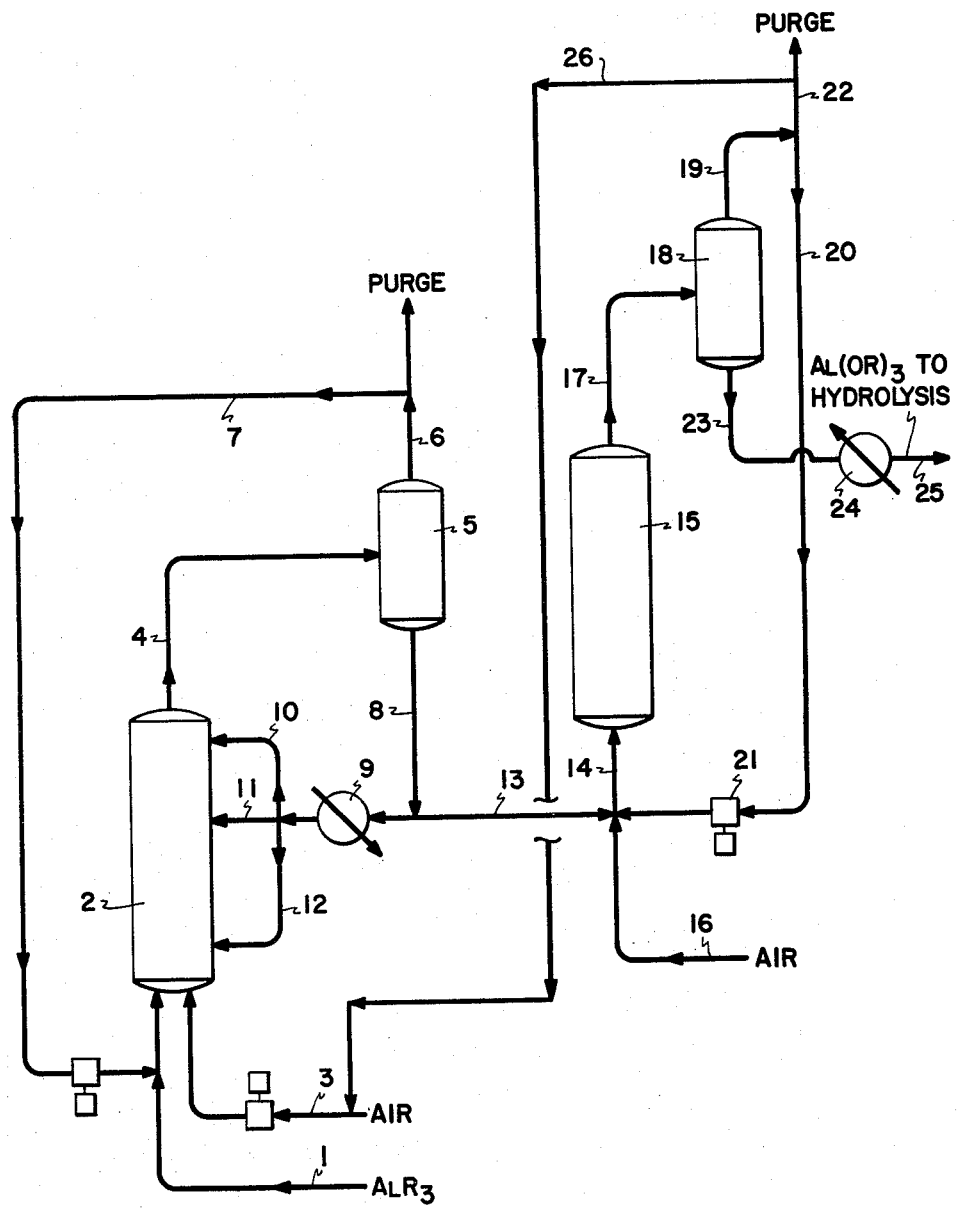

3,153,076
TWO-STAGE PROCESS FOR ALUMINUM ALKYL OXIDATION
Donald W. Wood, Westfield, Theodore Lewis, Roselle, John F. Johnson, Plainfield, and Isidor Kirshenbaum, Westfield, N.J., assignors to Esso Research and Engineering Company, a corporation of Delaware
Filed Dec. 5, 1962, Ser. No. 243,704
10 Claims. (Cl. 260—448)

The present invention relates to an improved process for the preparation of aluminum alcoholates and alcohols from aluminum trialkyls. More particularly, this invention relates in such a process, to carry out the oxidation of the aluminum alkyls to alcoholates in two stages; operating the first stage at low oxygen partial pressures and operating the second stage at higher oxygen partial pressures. By the process of this invention high overall reaction rates are obtained, over-oxidation which produces oxidation contaminants and/or carbonaceous materials is avoided or minimized, and complete conversion of the aluminum alkyls to the aluminum alcoholate is secured. Most particularly, this invention relates to a process wherein (1) an aluminum trialkyl having 2–4 carbon atoms per alkyl group is reacted with ethylene in the presence of less than about 30 wt. percent of a diluent to obtain a higher aluminum trialkyl growth product; (2) the aluminum alkyl growth product-diluent mixture is oxidized in the above described 2-stage process, and (3) the aluminum alcoholate is hydrolyzed to the alcohol. This application is a continuation-in-part of Serial Number 837,916 filed September 3, 1959, now abandoned.

According to the present invention, an aluminum trialkyl or mixtures of aluminum trialkyls (wherein each alkyl radical contains from 2–24 or more carbon atoms) are oxidized in two stages under carefully controlled temperature and pressure conditions (and if desired, in the presence of a specific amount of a diluent) to result in a rapid and complete oxidation. The aluminum trialkyls which may be oxidized according to the present invention process may be represented by the following formula:

wherein the R's represent the same or different alkyl radicals containing from 2–24 or more carbon atoms each. Thus, typical aluminum trialkyls include aluminum trihexyl, trioctyl, tridecyl, tridodecyl, etc. The mixed aluminum trialkyls are illustrated by the following: aluminum hexyl-dioctyl, aluminum dihexyl-octyl, aluminum butyl-octyl-dodecyl; aluminum diheptylnonyl and so forth.

The particular manner in which these aluminum trialkyls are prepared is not a critical factor of this invention; however, to illustrate the utility and versatility of the instant invention a few general methods of preparation will be briefly outlined. Low molecular weight aluminum trialkyls, the starting materials for higher aluminum trialkyls, may be prepared by reacting a low molecular weight alkyl halide with aluminum metal, preferably in the form of an alloy with magnesium, at elevated temperatures, or by reacting for example $Al + H_2 +$ olefin at elevated pressures of 1500–3000 p.s.i.a. and moderate temperatures.

One way of preparing a higher molecular weight aluminum trialkyl, e.g. trioctyl, is to react a higher olefin, e.g. n-octene-1 with a low molecular weight aluminum trialkyl to produce aluminum trioctyl as shown in the following equation:

If higher aluminum trialkyls are desired to be obtained by the growth reaction, a low molecular weight aluminum trialkyl may be reacted with ethylene (usually in the presence of an inert diluent to obtain increased reaction rates under elevated temperatures) to grow the lower olefin onto the alkyl radicals of the aluminum trialkyl. Suitable conditions are temperatures of 25–100° C., ethylene partial pressures of 500–3000 p.s.i.a., reaction times 1–10 hours and diluent concentrations (if a diluent is used) of 1–90, preferably 5–30 wt. percent based on growth product mixture. Suitable diluents are the same ones used in the oxidation to alcoholates step which will be described below. The following equation is illustrative of this so-called growth reaction:

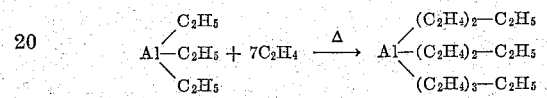

The length and distribution of the alkyl radicals on the aluminum trialkyl growth product can be varied with the operating conditions and length of reaction time. Generally, the growth is controlled to obtain product aluminum trialkyls having a smear of various molecular weight compounds wherein the alkyl radicals will contain from 2–24+ carbon atoms. Thus, for example, it may be desired to obtain a growth product averaging between about 8–12 carbon atoms per alkyl group. In the above growth process it will be noted that the alkyls are all straight chain or normal materials which fact is extremely desirable in that thus straight chain alcoholates and/or alcohols are prepared.

According to the present invention it has now been found that low diluent concentrations are necessary in the oxidation step to obtain low carbonyl number product alcohols. This quality specification is extremely important in terms of $C_4$–$C_{13}$ alcohols. These alcohols are used in the preparation of phthalate esters and as is well known in the art these materials should be prepared from low carbonyl number alcohols if a good color plasticizer for polyvinyl chloride resins is to be obtained. Unfortunately, rates of oxidation suffer greatly from low diluent concentrations and methods for increasing these rates such as increasing pressures cannot be used since they again increase carbonyl numbers. It has now been discovered that two of the aluminum carbon bonds of an aluminum trialkyl oxidize to the alcoholate very rapidly and exothermically at low temperatures and pressures while the third aluminum carbon bond oxidizes very slowly with a relatively small heat of reaction. Thus, it has now been found that by conducting only the latter reaction under more severe conditions (i.e. by using higher oxygen partial pressures) low carbonyl number products along with reasonable reaction times can be obtained.

According to the present invention a two-stage oxidation process was developed as follows. In the first stage two of the aluminum carbon bonds of the aluminum alkyl are oxidized at oxygen partial pressures of between 1 and 10 p.s.i.a., and at temperatures of −25 to 150° C. Amounts of oxygen-containing gas supplied are preferably 0.8–1.2 mols $O_2$/mol aluminum trialkyl. An inert organic diluent may be used if desired both to increase reaction rates in oxidation and to reduce the viscous nature of the material for better handling purposes. Diluents which may be used may be inert hydrocarbon diluents comprising aromatics such as benzene, toluene, xylene and $C_5$–$C_8$ paraffins, e.g. pentane, hexane and heptane (normal or branched chain). Additionally, halogenated hydrocarbons of the above type and materials such as ethyl ether and petroleum ether may be used. In the case of the higher aluminum trialkyls, such as above $C_6$ aluminum trialkyls, the use of heptane permits easy separation of the diluent from the alcohol product by distillation. In one embodiment of the present invention two-stage process if a diluent is used, amounts may be in the range of 1–90 wt. percent diluent based on the total mixture, preferably 5–30 wt. percent. As previously mentioned utilizing low concentrations of diluent in the present two-stage oxidation greatly decreases the carbonyl number of the product alcohol obtained. This carbonyl number in addition to being an important and vital quality specification for certain alcohols is probably also the best measuring stick for determining improvements in yields and purity of product obtained in all oxidation of aluminum alkyls processes.

Following the first stage of the remainder of the product not recycled is fed to the second stage where the third aluminum carbon bond is readily oxidized under high oxygen partial pressure preferably using high pressure air in combination with recycle gas. In this second stage amounts of oxygen-containing gas supplied are preferably that amount so that the total amount of $O_2$ supplied in both stages is approximately 15 mols $O_2$/mol aluminum trialkyl. The higher partial pressure of oxygen desired in the second stage may alternatively be obtained by utilizing higher concentrations of oxygen rather than only increased pressures. However, operation outside ranges of explosive conditions with the aluminum alkyls may require using for example, dilute air as the oxidizing gas. By this two-stage process by-product contaminants are either not formed or are minimized since the first two, highly reactive aluminum carbon bonds have already been oxidized at a lower pressure and thus, are present as less reactive materials in the second stage more severe oxidation. The oxygen partial pressure in the second stage should be in the range of 5–75 p.s.i.a. and temperatures should be −25° C. to 150° C. Cooling is not required in the second stage since the heat of reaction is so small that the liquid will increase only slightly in temperature as it passes through the reactor. In summary, in a preferred embodiment where no diluent or only a small amount of the inert organic diluent, i.e. about 1–30 wt. percent of diluent based on the total mixture is utilized, temperatures and oxygen partial pressures may be in the range of 25 to 100° C. and 1 to 3 p.s.i.a. in the first stage and 50 to 150° C. and 5 to 20 p.s.i.a. in the second stage. Obviously, prior to the present complete oxidation, particularly in the absence of a diluent, or with low diluent concentrations, could not be carried out in any reasonable time without some over-oxidation in the one-stage systems of the prior art. This was due to the highly exothermic nature of the oxidation of the first two aluminum carbon bond reactions, and to the low temperatures and pressures required to prevent the formation of by-product impurities.

The present invention will be more clearly understood from a consideration of the accompanying figure describing a preferred method of carrying out the oxidation of the aluminum alkyls process. Thus, the aluminum trialkyl material in combination with an inert solvent, if desired, is introduced through line 1 to low pressure reactor 2. Fresh make-up air is supplied through line 3 and the reacted material is passed overhead through line 4 to gas-liquid separator 5. Here, the oxidation gases, predominantly nitrogen, are separated overhead through line 6 and a part of them may be recycled through line 7 to be combined with aluminum alkyl material supplied through line 1 to lower the oxygen partial pressure and consequently the reaction rate. Additionally, liquid product separated may be passed through line 8, cooled in cooler 9 and recycled to the tower through lines 10, 11 or 12 to absorb the large heat of reaction in the first stage reactor. The remainder of the product is fed through lines 13 and 14 to the second stage reactor 15 where the third aluminum carbon bond is oxidized under high pressure. Here, fresh make-up air is supplied through line 16 and reactor product is passed through line 17 to separator 18 where oxidation gases are separated overhead through line 19. A part of these gases are recycled through line 20 and compressor 21 to line 14 to dilute the air supplied to the reactor. The remainder of the gases are purged through line 22 and completely oxidized liquid aluminum alcoholate product is passed through line 23 to cooler 24 and thence through line 25 to aluminum alcoholate hydrolysis not shown. Alternatively, if desired, part of the purged gases from line 22, for example 30 to 90% may be recycled to the first stage through line 26 to provide additional cooling.

Following preparation of the aluminum alcoholate this material is hydrolyzed with water under acid or basic conditions at temperatures of 50° F. to 150° F., atmospheric pressure and above, reaction times of 10 minutes to 10 hours depending on type of alumina desired. The two-stage oxidation described above provides large advantages in that the growth alkyl product is completely oxidized with minimum carbonyl and by-product formation. Additionally, without complete oxidation the unreacted alkyl chains are hydrolyzed to paraffins which, of course, appear as contaminants in the finished alcohol products and present difficulties in purification of the finished alcohol.

The present oxidation process is particularly useful in the processes wherein the higher aluminum alkyls are prepared by aluminum trialkyl growth processes. Thus, it is now known that the growth reaction may be carried out efficiently utilizing less than about 25 wt. percent, e.g. about 10 wt. percent, of an organic diluent or no diluent. Therefore, since the amount of diluent needed in growth and oxidation may be the same, a very efficient combination process can be obtained. Since in prior art processes a diluent was thought to be required to protect against spontaneous ignition of the low aluminum alkyls in the growth reaction process the need for high diluent concentrations in the oxidation step was not questioned, since obviously, it is not economic to separate diluent from the highly reactive aluminum alkyl growth reaction product prior to the oxidation step. Thus, aluminum triethyl, the growth reactant conventionally used in preparing higher aluminum alkyls, is spontaneously inflammable in air in the absence of large amounts of a diluent and although it was known that higher aluminum alkyls such as $C_4$–$C_8$ aluminum trialkyls which are not spontaneously inflammable in air could be used in the growth reaction to alleviate this problem, this was not considered economic since the diluent was required in the oxidation step anyway.

Thus, it has now been found that the present two-stage oxidation process, wherein complete oxidation can be obtained in the presence of only a minimum amount of a diluent added to reduce viscosity, removes a bottleneck to obtaining a very economic low diluent aluminum alkyl growth process for the preparation of alcohols. This process, of course, can be either of the conventional aluminum triethyl starting material type where precautions against inflammability must be taken, or the type of process where non-inflammable higher starting materials are used.

In a preferred embodiment conditions in the first stage are temperatures of 30 to 65° C. and partial pressures of oxygen of 1 to 5 p.s.i.a. along with oxygen flow rates of 3 to 7 liters of oxygen per minute per kilogram of aluminum alkyl and in the second stage preferred conditions are temperatures of 65 to 90° C., oxygen partial pressures of 15 to 30 p.s.i.a. and oxygen flow rates of 3 to 7 liters of oxygen per minute per kilogram of aluminum alkyl.

The following laboratory data presented in Examples 1 through 4 help to define the present invention.

EXAMPLE 1

*Oxidation of Al(Octyl)₃*

| | | | | |
|---|---|---|---|---|
| Aluminum Alkyl, grams Al(octyl)₃ | | 50 | | |
| Solvent, n-heptane | | | | |
| Solvent Concentration, wt. percent | | 15 | | |
| Stirrer | Yes | No | No | No |
| Temperature | 10 | 30 | 65 | 95 |
| Air Rate, Atm. Pressure, liter/min | | 1 | | |
| Time for Oxygen Absorption, min. for: | | | | |
| 1st ⅓ of O₂ required | 7½ | 8 | 8 | 10 |
| 2nd ⅓ of O₂ required | 10 | 10 | 12 | 13 |
| 3rd ⅓ of O₂ required | >60 | >30 | >30 | >60 |

Thus, it is seen that the third aluminum carbon bond requires an extremely long time for it to be oxidized completely as compared with the time required for the oxidation of the first two aluminum carbon bonds.

EXAMPLE 2

An aluminum alkyl growth product when oxidized at 70° C. and 500 p.s.i.a. with air resulted in the formation of black carbonaceous material. Oxidation at 70° C. (normal) should not result in the formation of a black carbonaceous material. This example shows the deleterious effect of oxidizing at elevated pressure in one stage.

EXAMPLE 3

In Run 1 below aluminum tri-normal butyl was reacted with air in the presence of a diluent at an average temperature of 65° C. and atmospheric pressure. In Run 2 the pressure was increased to 100 p.s.i.a. after two of the three aluminum carbon bonds were oxidized.

*Air Oxidation of Al(nC₄)₃ (n-Heptane Diluent)*

| Run | Air Pressure, p.s.i.a. Initial | Air Pressure, p.s.i.a. Final | Alkyl Conc. Wt. percent | Carbonyl No. of Butanol | Temp., °C. |
|---|---|---|---|---|---|
| 1 | 0 | 0 | 25 | 8.5 | 65 |
| 2 | *0 | 100 | 25 | 5.5 | 65 |

* Pressure increased to 100 p.s.i. after two of three bonds were oxidized.

were oxidized.

As can be seen, by operating a two-stage process utilizing air first at atmospheric, and then at a pressure of 100 p.s.i.a., carbonyl numbers were reduced by more than 35%.

EXAMPLE 4

*Oxidation of Al(nC₄)₃*

| | (¹) | (¹) | (¹) |
|---|---|---|---|
| Solvent | | | |
| Alkyl Concentration, wt. percent | 75 | 50 | 25 |
| Temperature, °C | 30 | 30 | 30 |
| Partial Pressure, O₂ p.s.i.a | 3 | 3 | 3 |
| Time for 20% O₂ in Exit Gas, min | 195 | 98 | 89 |
| Carbonyl No | 6.2 | 13.3 | 22.7 |

¹ n-Heptane.

This example shows that decreased diluent concentration is desirable from carbonyl number point of view but undesirable from rate of oxidation.

EXAMPLE 5

An aluminum trialkyl is prepared utilizing aluminum tri-n-butyl as a starting material. This material is reacted with ethylene in the presence of 25 wt. percent of n-heptane based on total growth product at a temperature of 90° C., ethylene partial pressure of 1500 p.s.i.a. and utilizing a reaction time of 3 hours to obtain an uptake of ethylene of 6 moles of ethylene per 1 mole of aluminum alkyl and thus obtaining a growth material having an average alkyl length of 8 carbon atoms. The total growth reaction product is then oxidized in a two-stage process as described in the drawing; at a temperature of 65° C. and an oxygen partial pressure of 3 p.s.i.a. in the first stage and a temperature of 90° C. and oxygen partial pressures of 30 p.s.i.a. in the second stage. The material from this reaction is then hydrolyzed with water at temperatures of 75° F. and atmospheric pressure to obtain a mixture of alcohols having an average number of carbon atoms of 8.

It is to be understood that this invention is not limited to the specific examples, which have been offered merely as illustrations, and that modifications may be made without departing from the spirit of this invention.

What is claimed is:

1. A process for oxidizing an aluminum trialkyl to the corresponding aluminum trialcoholate, each alkyl group of said aluminum trialkyl containing from 2 to 24 carbon atoms, which comprises passing said aluminum trialkyl and air into a first reaction zone, maintaining said aluminum trialkyl in said first reaction zone at a temperature of about 30° C. to 65° C. under an oxygen partial pressure of about 1 to 5 p.s.i.a. for a sufficient time to oxidize two of the aluminum carbon bonds in said aluminum trialkyl, passing partially oxidized aluminum trialkyl and air into a second reaction zone, maintaining partially oxidized aluminum trialkyl in said second reaction zone at a temperature of about 65° to about 90° C. under an oxygen partial pressure of about 15 to about 30 p.s.i.a. for a sufficient time to substantially completely oxidize said partially oxidized aluminum trialkyl to aluminum trialcoholate, separating spent air partially depleted of its oxygen content from liquid aluminum trialcoholate and recycling 30% to 90% of said spent air to the first reaction zone.

2. The process of claim 1 in which the oxygen flow rate in the first reaction zone and in the second reaction zone is 3 to 7 liters of oxygen per minute per kilogram of aluminum trialkyl.

3. A process for oxidizing an aluminum trialkyl to the corresponding aluminum trialcoholate, each alkyl group of said aluminum trialkyl containing from 2 to 24 carbon atoms, which comprises passing said aluminum trialkyl and air into a first reaction zone, maintaining said aluminum trialkyl in said first reaction zone at a temperature of about 65° C. under an oxygen partial pressure of about 3 p.s.i.a for a sufficient time to oxidize two of the aluminum carbon bonds in said aluminum trialkyl, passing partially oxidized aluminum trialkyl and air into a second reaction zone, maintaining partially oxidized aluminum trialkyl in said second reaction zone at a temperature of about 65° to about 90° C. under an oxygen partial pressure of about 20 to about 30 p.s.i.a for a sufficient time to substantially completely oxidize said partially oxidized aluminum trialkyl to aluminum trialcoholate, separating spent air partially depleted of its oxygen content from liquid aluminum trialcoholate and recycling 30% to 90% of said spent air to the first reaction zone.

4. A process for oxidizing an aluminum trialkyl to the corresponding aluminum trialcoholate, each alkyl group of said aluminum trialkyl containing from 2 to 24 carbon atoms, which comprises passing said aluminum trialkyl and air into a first reaction zone, maintaining said aluminum trialkyl in said first reaction zone at a temperature of about 65° C. under an oxygen partial pressure of about 3 p.s.i.a. for a sufficient time to oxidize two of the aluminum carbon bonds in said aluminum trialkyl, passing partially oxidized aluminum trialkyl and air into a second reaction zone, maintaining partially oxidized aluminum trialkyl in said second reaction zone at a temperature of about 90° C. under an oxygen partial pressure of about 30 p.s.i.a. for a sufficient time to substantially completely oxidize said partially oxidized aluminum trialkyl to aluminum trialcoholate.

5. The process of claim 4 in which the aluminum trialkyl which is oxidized is prepared by reacting a $C_2$–$C_5$ aluminum trialkyl with ethylene in the presence of 5–30 wt. percent of an inert organic diluent to obtain a higher aluminum trialkyl, and in which the entire higher aluminum trialkyl and diluent product mixture is oxidized.

6. The process of claim 4 in which the number of carbon atoms in each alkyl radical of said aluminum trialkyl is between 8 and 12.

7. The process of claim 4 in which said aluminum trialkyl is dispersed in 1 to 30 wt. percent of an inert organic diluent.

8. The process of claim 7 in which the inert organic diluent is n-heptane.

9. A process for oxidizing an aluminum trialkyl to the corresponding aluminum trialcoholate, each alkyl group of said aluminum trialkyl containing from 2 to 24 carbon atoms, which comprises passing said aluminum trialkyl and air into a first reaction zone, maintaining said aluminum trialkyl in said first reaction zone at a temperature of about 65° C. under an oxygen partial pressure of about 3 p.s.i.a. for a sufficient time to oxidize two of the aluminum carbon bonds in said aluminum trialkyl, passing partially oxidized aluminum trialkyl and air into a second reaction zone, maintaining partially oxidized aluminum trialkyl in said second reaction zone at a temperature of about 65° C. under an oxygen partial pressure of about 20 p.s.i.a for a sufficient time to substantially completely oxidize said partially oxidized aluminum trialkyl to aluminum trialcoholate.

10. A process for oxidizing an aluminum trialkyl to the corresponding aluminum trialcoholate, each alkyl group of said aluminum trialkyl containing from 2 to 24 carbon atoms, which comprises passing said aluminum trialkyl and air into a first reaction zone, maintaining said aluminum trialkyl in said first reaction zone at a temperature of about 65° C. under an oxygen partial pressure of about 3 p.s.i.a for a sufficient time to oxidize two of the aluminum carbon bonds in said aluminum trialkyl, passing partially oxidized aluminum trialkyl and air into a second reaction zone, maintaining partially oxidized aluminum trialkyl in said second reaction zone at a temperature of about 65° to about 90° C. under an oxygen partial pressure of about 20 to about 30 p.s.i.a. for a sufficient time to substantially completely oxidize said partially oxidized aluminum trialkyl to aluminum trialcoholate.

References Cited in the file of this patent

UNITED STATES PATENTS

| | | |
|---|---|---|
| 2,863,895 | Kirshenbaum et al. | Dec. 9, 1958 |
| 2,892,858 | Ziegler | June 30, 1959 |
| 2,959,607 | Werber et al. | Nov. 8, 1960 |
| 3,042,696 | Aldridge | July 3, 1962 |

OTHER REFERENCES

Ziegler et al.: Angew. Chem. vol. 67, No. 16 (1955), pp. 424–426.